(12) United States Patent
Rost et al.

(10) Patent No.: US 7,927,446 B2
(45) Date of Patent: Apr. 19, 2011

(54) METHOD OF PRODUCING MULTICOLORED FILMS

(75) Inventors: Eberhard Rost, Aalen (DE); Siegfreid Höfchen, Suessen (DE); Matthias Reik, Göppingen-Manzen (DE)

(73) Assignee: Benecke-Kaliko AG, Hannover (DE)

( * ) Notice: Subject to any disclaimer, the term of this patent is extended or adjusted under 35 U.S.C. 154(b) by 406 days.

(21) Appl. No.: 12/112,116

(22) Filed: Apr. 30, 2008

(65) Prior Publication Data

US 2008/0199679 A1    Aug. 21, 2008

Related U.S. Application Data

(63) Continuation of application No. PCT/EP2006/067873, filed on Oct. 27, 2006.

(30) Foreign Application Priority Data

Dec. 13, 2005    (DE) .......................... 10 2005 059 359

(51) Int. Cl.
*B32B 37/00*    (2006.01)

(52) U.S. Cl. ..... 156/209; 156/220; 156/301; 156/308.4; 156/309.6; 156/324; 156/554

(58) Field of Classification Search .......... 156/299–303, 156/554, 244.25, 209, 219–220, 308.4, 309.6, 156/322, 324

See application file for complete search history.

(56) References Cited

U.S. PATENT DOCUMENTS

| 5,811,046 | A  | * | 9/1998  | Dous et al. ............... 264/173.18 |
| 6,368,445 | B2 | * | 4/2002  | Rost et al. ................ 156/244.25 |
| 6,670,012 | B2 |   | 12/2003 | Campbell et al. |
| 2002/0187309 | A1 | * | 12/2002 | Rost et al. ...................... 428/172 |
| 2003/0175467 | A1 | * | 9/2003  | Campbell et al. ............... 428/61 |

FOREIGN PATENT DOCUMENTS

| DE | 195 30 757 A1 | 2/1997 |
| DE | 101 21 518 A1 | 11/2002 |
| WO | 03/080397 A1 | 10/2003 |

OTHER PUBLICATIONS

International Search Report, dated Feb. 5, 2007.

* cited by examiner

*Primary Examiner* — Jeff H Aftergut
*Assistant Examiner* — David Simmons
(74) *Attorney, Agent, or Firm* — Laurence A. Greenberg; Werner H. Stemer; Ralph E. Locher

(57) ABSTRACT

Multicolored film composites are produced by laminating a support film with at least two different-colored top films. The surface of the top films or of the film composite is provided with a surface structure. The support film is a film of thermoplastic foam material, and the top films are laminated on in temporal succession and in overlapping relationship onto the support film.

13 Claims, 1 Drawing Sheet

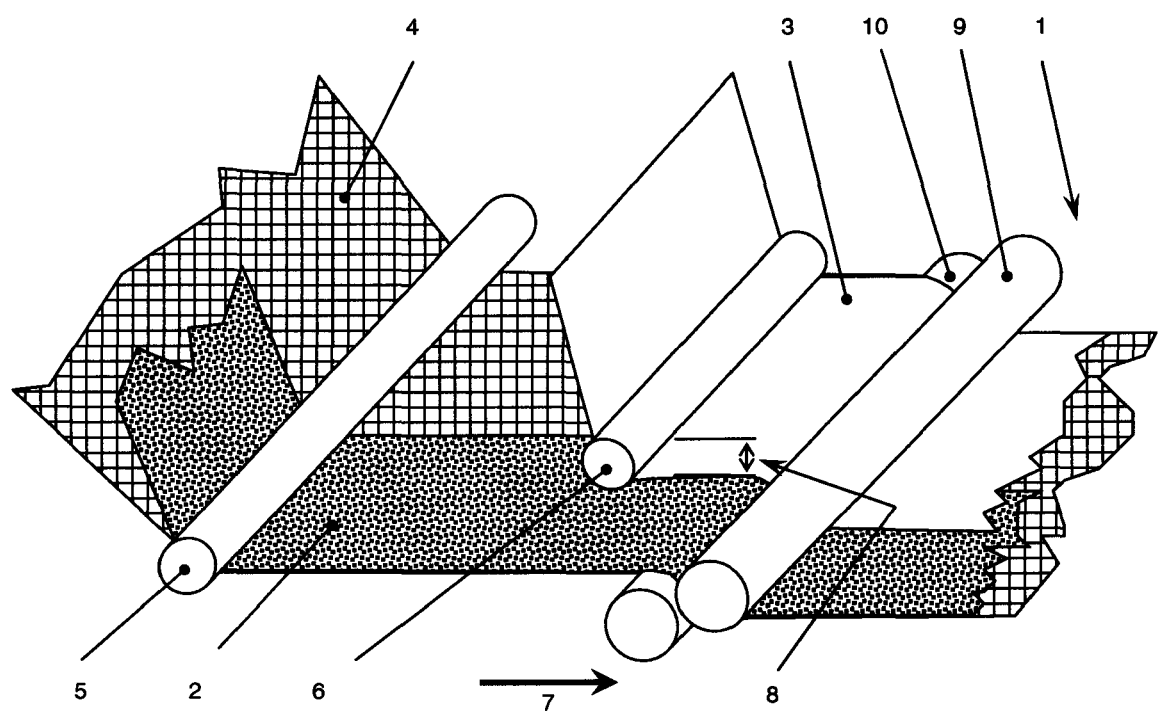

US 7,927,446 B2

METHOD OF PRODUCING MULTICOLORED FILMS

CROSS-REFERENCE TO RELATED APPLICATIONS

This is a continuing application, under 35 U.S.C. §120, of copending international application No. PCT/EP2006/067873, filed Oct. 27, 2006, which designated the United States; this application also claims the priority, under 35 U.S.C. §119, of German patent application No. DE 10 2005 059 359.3, filed Dec. 13, 2005; the prior applications are herewith incorporated by reference in their entirety.

BACKGROUND OF THE INVENTION

Field of the Invention

The invention relates to a method of producing multicolored films or foils by laminating a support film with at least two different-colored top films and applying, if desired, further layers of coating material or of adhesive. The surface of the top films and/or of the film assembly is provided with a surface structure, preferably embossed, and thereafter, if desired, cut to shape. The surface structure is composed, for example, of a leatherlike or technical grain structure.

U.S. Pat. No. 5,811,046 and its corresponding German published patent application DE 195 30 757 A1 describe a method and apparatus for producing two-colored or multicolored films intended, for example, for dashboards, by using a specially shaped extrusion die to cover a support film composed of a polymeric material with further films or layers of polymer material whose coloring is different. For this purpose the extruder die features a slot or exit cross section for the extrudates of the support film, above which there are disposed two further exit cross sections for the colored outer layers, the outflow pathways or outflow channels of said further cross sections being separated by a wedge-shaped or triangular projection until a short way before the point of placement of the colored top material/outer-layer material on the support film. As a result of this arrangement the extrudate for the outer layers only converges a short way before the point of impingement on the support film, which does produce a reasonably good seam course between the different color regions, but ultimately does not make it possible to avoid slight mixing of the colors in the transition region. This method, accordingly, is more suitable for applications where only different depths of color abut one another—for example, therefore, different gray shades.

U.S. patent publication US 2002/0187309 A1 and its counterpart German published patent application DE 101 21 518 A1 describe a process for producing a two-colored or multicolored foamed film by covering a supporting underlayer of foamed film with an outer layer which in turn is composed of at least two layers: a support layer and at least one further layer. The support layer in this arrangement, in a first color, has indentations introduced by rolling or profiled in some other way, into which the further layer, in a different color, is inserted so as to produce a flush outside surface between support layer and further layer. These layers are applied by means of an extrusion process. The resulting color transitions are very good, and yet, as a result of the narrow-tolerance profilings required, and plurality of extruders, the mechanical and time resources required by the production process are considerable.

BRIEF SUMMARY OF THE INVENTION

It is accordingly an object of the invention to provide a method of producing multicolored films which overcomes the above-mentioned disadvantages of the heretofore-known devices and methods of this general type and which process can be used to achieve a sharp, distinctly contoured and clean color separation of individual color layers, without mixing zones; which can be carried out simply, cost-effectively, and with relatively low manufacturing complexity; and the quality of which is such as to make it suitable even for the lamination of sharply differing colors.

With the foregoing and other objects in view there is provided, in accordance with the invention, a method of producing multicolored films, the method which comprises:

providing a support film of thermoplastic foamed polymer;

providing mutually differently colored top films and laminating at least two of the different-colored top films onto the support film in temporal succession to form a film composite, with a temporally trailing top film overlapping a temporally leading top film in a seam region;

optionally applying further layers of coating material or of adhesive; and forming a surface structure on the top films or on the film composite, preferably by embossing, and optionally cutting the film composite to size.

In other words, the objects of the invention are achieved by providing a support film of thermoplastic foamed polymer, by laminating the different-colored top films in temporal succession onto the support film, and by overlapping the later-applied top film (i.e., the trailing film) with the earlier-applied top film (i.e., the leading film) in a seam region.

A procedure of this kind produces a so-called "unbacked foamed film," that is, a film with a foamed layer on the backside and an outer layer, but with no further supporting/reinforcing interlayers, and which has a dividing seam running exactly and straight between the two color layers, without erasions or color runs; and without meandering of the seam regions. Such "unbacked foamed films" or "unbacked foams" are able to bear relatively high degrees of forming in the course of subsequent deformation—in other words, for instance, during application to dashboard supports or door-lining supports for motor vehicles. Consequently they are far superior in deformability to the synthetic leathers, where a support layer made, for example, of textile fibers is bound in the product and remains there in the course of further processing.

The surprising quality of the seam region in the case of this very simple process can be attributed to the fact that, as a result of the temporally offset application of the top films, there is already a certain fixing of each top film on the supporting foam film; as a result of this, the defined docking and overlapping of the respectively trailing top films is substantially more reliable and easier. If a conventional process were to be used here, in which the heated top films are laminated simultaneously, then associated tensile stresses, heat accumulation, and temperature regime peculiarities could give rise to instances of widthwise necking in the top films, promoting an undefined and meandering overlap.

In one advantageous embodiment the surface structure is introduced by way of a rolling operation after lamination onto the support film, preferably by way of embossing rolls. During the process, the overlap region/seam region of the top films is reduced in its layer thickness. In interaction with the fixing of the individual top films as a result of the temporally offset placement, it is possible here, with the aid of such an embodiment, in a single further manufacturing step, to set the layer thickness of the mutually adjacent color layers, and the seam transition region, with a very high level of precision, which is important, in turn, for the clean course of the seam.

In a further advantageous embodiment, prior to lamination, the top films are each guided over heated roller beds and thereby preheated. This makes it possible to influence the reaction of the top films with the supporting foamed film and, as a result, the initial fixing of the individual top films to the support film, which is so important for the subsequent production steps.

The respective top films are applied to the support film under pressure with the aid of contact rolls, which are likewise heated if desired. For this purpose, advantageously, the top films are preheated by the heated rollers and rolls to a temperature of 90 to 180° C., preferably to 150° C. In interrelation with the roll pressure of the contact rolls, these temperatures have emerged as being particularly favorable for the process.

In accordance with a further advantageous embodiment of the invention, at least the temporally trailing top film is controlledly displaceable via a guide means in respect of its placement position, necessary for lamination onto the support film, transversely to the manufacturing direction. In this way it is possible to realize a sufficiently precise and simple uniaxial control, through which the respective top film can be positioned exactly, and in interrelation with the other parameters of temperature and placement pressure, in such a way as to produce a clean seam region. Of course, the placement of the temporally leading top film, or the position of the supporting foamed film transverse to the manufacturing direction, can also be controlled, albeit perhaps with somewhat greater complexity.

For the best-possible utilization of a production process of this kind, advantageously the support film is composed of foamed polyolefin polymer and the top films are composed of thermoplastic olefin. Both types of polymer can be readily processed at typical temperatures by means of the stated temperature and pressure regimes, and can be handled in the necessary liquid/pastelike production state. The same applies to support films and top films made of PVC polymers or polyurethane.

Other features which are considered as characteristic for the invention are set forth in the appended claims.

Although the invention is illustrated and described herein as embodied in method of producing multicolored films, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a partial perspective view of a production line for producing films according to the invention.

DETAILED DESCRIPTION OF THE INVENTION

Referring now to the FIGURE of the drawing in detail there is shown an outline diagram of a production plant for an unbacked foamed film 1 of the invention, having a two-colored top face. This unbacked foamed film 1 is composed of different-colored polymeric strips, which are laminated as top films 2 and 3 onto a supporting layer of a foamed polymer 4.

The assembly of the layer 4 with its top films 2 and 3 is referred to as a film composite.

Serving for this purpose are beds of rolls or laminating units, of which in this case, for the sake of ease of comprehension, only the last contact rollers, 5 and 6, are shown in each case. The top film 2 in this arrangement runs below the heated contact roll 5 onto the supporting foamed film made from foamed polymer 4 (support film), and is fixed in its placement by means of pressure and heat. The supporting film thereby has a thickness of 1 to 5 mm.

Offset temporally and in manufacturing direction 7, the top film 3 is then applied in such a way that it too is fixed by pressure and heat from the heated contact roll 6, this time both on the supporting layer (foamed film) 4 and in an overlap region 8 on the leadingly applied top film 2.

In a step subsequent to lamination, the top films 2 and 3 are provided with a surface structure. This is done by the embossing roll 9, which is supported by a support roll 10. Consequently the overlap region/seam region of the top films is reduced in its layer thickness and fixed completely. It is possible for the top films 2 and 3 to be provided beforehand with a layer of coating material, which may fulfill a variety of purposes—for example protection from mechanical damage, prevention of embrittlement by UV irradiation, and the like. A back-face adhesion varnish 6 is applied beforehand to the bottom face of the supporting layer 4. The adhesion varnish 6 facilitates subsequent joining to a three-dimensional article, such as a doorlining of a motor vehicle, for example.

The invention claimed is:

1. A method of producing multicolored films, the method which comprises:
    providing a support film of thermoplastic foamed polymer;
    providing mutually differently colored top films and laminating at least two of the different-colored top films onto the support film in temporal succession to form a film composite by first laminating a temporally leading top film onto the support film under pressure and subsequently laminating a temporally trailing top film onto the support film under pressure and onto the temporally leading top film, with the temporally trailing top film overlapping the temporally leading top film in a seam region;
    optionally applying further layers of coating material or of adhesive; and
    forming a surface structure on the top films or on the film composite, and optionally cutting the film composite to size.

2. The method according to claim 1, wherein the step of forming the surface structure comprises embossing the top films.

3. The method according to claim 1, wherein the step of forming the surface structure comprises a rolling operation after lamination of the top films onto the support film, and thereby reducing a layer thickness of the overlapping top films in the seam region.

4. The method according to claim 1, wherein the rolling operation comprises rolling with one or more embossing rolls.

5. The method according to claim 1, which comprises, prior to laminating, guiding the top films over heated roller beds and thereby preheating the top films.

6. The method according to claim 5, which comprises preheating the top films to a temperature of 90 to 180° C.

7. The method according to claim 5, which comprises preheating the top films to a temperature of substantially 150° C.

8. The method according to claim 1, which comprises controlling a placement of the temporally trailing top film with guide means in respect of a placement position thereof, necessary for lamination onto the support film, transversely to a production flow direction.

9. The method according to claim 1, wherein the providing steps comprise providing the support film composed of foamed polyolefin polymer and providing the top films composed of thermoplastic olefin.

10. The method according to claim 1, wherein the providing steps comprise providing the support film and the top films of PVC polymers or of polyurethane polymers.

11. A method of producing a multicolored film composite, the method which comprises:

provided a support film of thermoplastic foamed polymer and transporting the support film along a transport direction;

providing a first colored top film and laminating the first colored top film under pressure onto the foamed polymer at a first location;

providing a second colored top film having a color different from the first colored top film and laminating the second colored top film under pressure onto the support film and the first colored top film at a second location following the first location in the transport direction, with the second colored top film partly overlapping the first colored top film in a seam region; and subsequently embossing a surface structure onto the laminated film composite formed with the support film and the colored top films by processing with an embossing roll at a further location following the second location in the transport direction.

12. The method according to claim 11, which further comprises cutting the film composite to size following the embossing step.

13. The method according to claim 12, which further comprises applying further layers of coating material or of adhesive prior to or subsequently to the cutting step.

* * * * *